United States Patent [19]

Sugiyama et al.

[11] Patent Number: 4,986,131

[45] Date of Patent: Jan. 22, 1991

[54] SEMICONDUCTOR STRAIN DETECTOR

[75] Inventors: Susumu Sugiyama, Nagoya; Shiro Yamashita; Hirofumi Funabashi, both of Aichi, all of Japan

[73] Assignee: Kabushiki Kaisha Toyota Chuo Kenkyusho, Aichi, Japan

[21] Appl. No.: 458,538

[22] Filed: Dec. 28, 1989

[30] Foreign Application Priority Data

Dec. 28, 1988 [JP] Japan ................... 63-333863

[51] Int. Cl.⁵ .............................................. G01L 1/00
[52] U.S. Cl. ................................................... 73/766
[58] Field of Search .................. 73/1 B, 766, 862.62, 73/708; 338/3, 7

[56] References Cited

U.S. PATENT DOCUMENTS

| | | | |
|---|---|---|---|
| 4,333,349 | 6/1982 | Mallon et al. | 73/708 |
| 4,404,539 | 9/1983 | Yamada et al. | 338/3 |
| 4,576,052 | 3/1986 | Sugiyama . | |
| 4,715,003 | 12/1987 | Keller et al. | 73/766 |
| 4,813,272 | 3/1989 | Miyazaki et al. | 73/708 |

FOREIGN PATENT DOCUMENTS

| | | |
|---|---|---|
| 57-500489 | 3/1982 | Japan . |
| 0691682 | 10/1979 | U.S.S.R. ................ 73/1 B |

*Primary Examiner*—Robert Raevis
*Attorney, Agent, or Firm*—Oblon, Spivak, McClelland, Maier & Neustadt

[57] ABSTRACT

In a semiconductor strain detector, the temperature characteristic of the output of a zero-point temperature compensating circuit is added to the zero-point temperature characteristic of the output of a bridge circuit composed of strain gauges, to perform a zero-point temperature compensation of the final output. Further, two kinds of diffusion resistors having different surface impurity densities are used in each amplifying circuit to perform a sensitivity-temperature compensation in which a temperature coefficient of sensitivity is considered up to the second-order term.

22 Claims, 9 Drawing Sheets

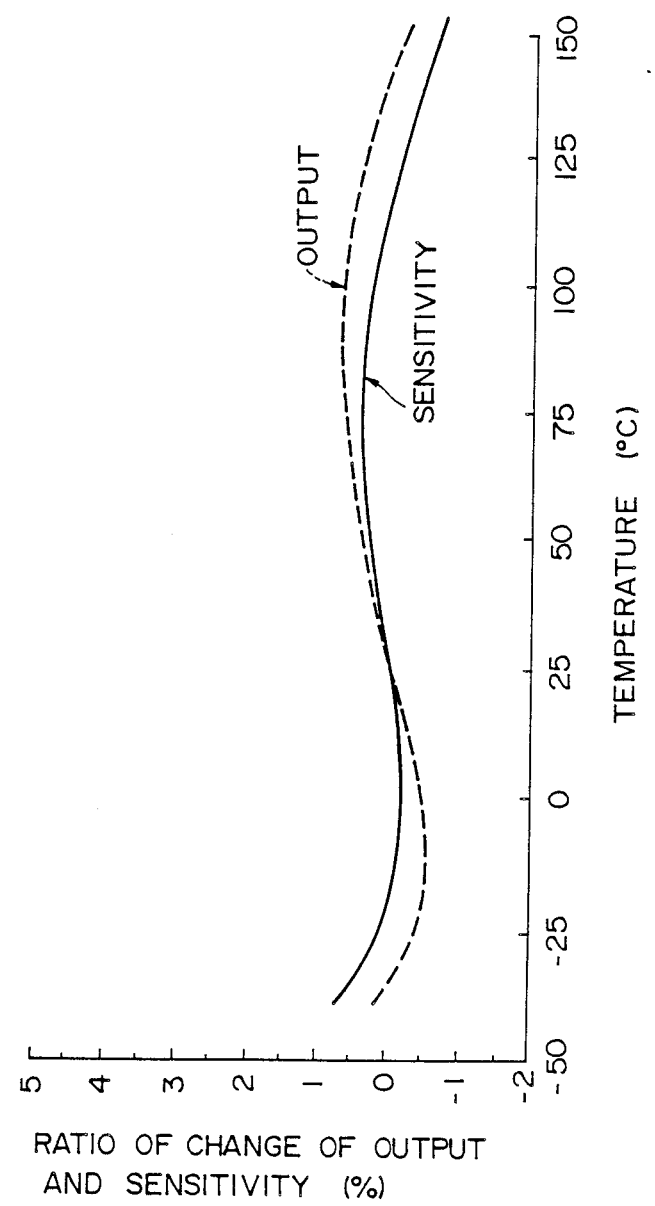

SEMICONDUCTOR STRAIN DETECTOR

BACKGROUND OF THE INVENTION

1. Field of the Invention

This invention relates to a semiconductor strain detector for use as a pressure sensor, for example, and more particularly to temperature compensation of a zero-point and/or sensitivity of the semiconductor strain detector.

2. Description of the Related Art

Semiconductor strain detectors utilizing semiconductor strain gauges have hitherto been used as apparatus for converting an amount of mechanical displacement to an electrical signal. Such apparatus is exemplified by a semiconductor pressure sensor.

Such a conventional semiconductor pressure sensor is composed of a pressure detector formed on a silicon single crystal and utilizing a semiconductor strain gauge. The sensor measures a pressure in terms of the resistance change of the semiconductor strain gauge which is caused by a pressure change.

In this conventional pressure sensor, partly because compact size and high precision can be realized by μm-order micro-machining technology, and partly because mass production can be easily achieved by a semiconductor manufacturing apparatus, sharp reduction in production cost can be expected and, therefore, the practical use of the pressure sensors is on the progress in the fields of automobile and household appliances.

However, since a semiconductor is temperature dependent in itself, it is necessary to apply a temperature compensation to a semiconductor pressure sensor. In general, the temperature characteristics of a semiconductor pressure sensor can be classified into (1) a temperature characteristic independent of impressed pressure, namely, a zero-point temperature characteristic, and (2) a temperature characteristic dependent on pressure, namely, a sensitivity-temperature characteristic.

The zero-point temperature characteristic and the sensitivity-temperature characteristic in the conventional semiconductor pressure sensor will now be separately described in detail.

Zero-point Temperature Compensation

When a bridge circuit is composed of a diffusion strain gauges, its zero-point temperature characteristic is created due to the scattered temperature coefficients of resistance of the individual diffusion strain gauges and also due to the difference in thermal expansion coefficient between a base joined with a silicon single crystal substrate. If the thermal expansion coefficients of the base is substantially equal to the temperature coefficient of the silicon single crystal substrate, the zero-point temperature characteristic can be held within a very small range; that is, it can be considered that the zero-point temperature characteristic varies rectilinearly with respect to temperature. Further, in the case of the bridge circuit with four diffusion strain gauges, the temperature change of zero point would become positive or negative depending on the variety of temperature coefficients of these gauges.

FIG. 10 of the accompanying drawings shows a prior art solution which has been proposed in an effort to make all the temperature characteristics in the entire bridge circuit equal. As shown in FIG. 10, an adjusting series resistor $R_S$, or parallel resistor $R_P$, with a small temperature coefficient of resistance is inserted in an optional side of a bridge circuit 1 composed of four diffusion strain gauges $G_1$, $G_2$, $G_3$, $G_4$. The temperature characteristics in the entire bridge circuit 1 has been made consistent by adjusting the resistance of the series resistor $R_S$ or the parallel resistor $R_P$.

Sensitivity-Temperature Compensation

For the sensitivity-temperature compensation for usual bridge circuits composed of diffusion strain gauges, a constant-current sensitivity-temperature self-compensating method has hitherto been used utilizing a resistance-temperature characteristic of a diffusion resistor formed by diffusing impurities in a silicon single crystal. In this method, the lowering of sensitivity-temperature characteristic with the temperature rise is compensated by the increase of the applied voltage of a bridge circuit which is supplied with constant current, because the resistance of the diffusion strain gauge increases with the temperature rise. Namely, since the sensitivity-temperature and resistance-temperature characteristics depend on the surface impurity concentration of the diffusion resistor, it is possible to reduce the temperature dependence of the output signal to virtually zero by choosing a suitable surface impurity concentration.

FIG. 11 shows a prior art circuit for sensitivity-temperature compensation, which is disclosed in Japanese Patent Laid-Open Publication No. 443/1983.

In this prior art, the bridge circuit 1 is composed of four diffusion strain gauges G each having a resistance $R_g$. To the input terminal of this bridge circuit 1, a power source voltage $V_{CC}$ is applied. The output terminal of the bridge circuit 1 is connected to a pair of input terminal of an amplifier 2, and a negative feedback resistor 3 having a resistance $R_f$ is disposed between the output terminal and the inverted input terminal of the amplifier 2. The non-inverted input terminal of the amplifier 2 is connected to the ground via a resistor 4 having a resistance $R_f$.

The output of the bridge circuit 1 receives a predetermined amplification by the amplifier 2 and is then outputted as an output signal $V_0$ which can be approximately expressed as follows:

$$V_0 \approx 2(R_F/R_g)k \cdot \{1+(\alpha_f-\alpha_g+\beta_g)T\} \cdot P \cdot V_{CC} \qquad (1)$$

where k is a sensitivity of the bridge circuit 1, P is a pressure applied, $\beta_g$ is a sensitivity-temperature coefficient of the bridge circuit 1 composed of the diffusion strain gauges G, $\alpha_g$ is a temperature coefficient of the resistance in the individual diffusion strain gauge G, $\alpha_f$ is a temperature coefficient of resistance of the negative feedback resistor 3 in the operational amplifier 2, and T is a temperature. Here assuming that an amount of resistance change at two confronting sides of the bridge circuit 1 is $\Delta R$, there is held the equation $kP=\Delta R/R_g$.

Consequently, in the prior art, the sensitivity-temperature compensation was performed by equalizing the difference between $\alpha_f$ and $\alpha_g$ with $\beta_g$.

The zero-point temperature compensation and the sensitivity-temperature compensation in the pressure sensor utilizing the conventional semiconductor strain detector have the following problems.

Zero-point Temperature Compensation

In the bridge circuit 1 composed of diffusion strain gauges $G_1$, $G_2$, $G_3$, $G_4$ of FIG. 10, the temperature characteristic at the output terminals (+OUT, −OUT) of the bridge circuit 1 was adjusted by disposing resistors $R_S$, $R_P$ each having a small temperature coefficient of resistance in series or in parallel so that the temperature coefficient of resistance at the side of diffusion strain gauge $G_1$ could be changed.

However, for this temperature compensation, the resistance of each resistor $R_S$, $R_P$ needed to be determined from its output on a trial-and-error basis, judging from the output from the bridge circuit 1 actually experiencing temperature change. Therefore, this adjustment was very complex and difficult.

Further, as the sensitivity of a semiconductor pressure sensor is several tens mV order, the output of the bridge circuit 1 is necessary to be amplified to the order of V by an amplifying circuit usually composed of an operational amplifier. Therefore, the output of the bridge circuit 1 subjected to the zero-point temperature compensation must be amplified with an expensive operational amplifier having a good temperature characteristic, or it is necessary to conduct a further zero-point temperature compensation of the entire circuit after amplified with the amplifying circuit.

To this end, it has been proposed to modulate the output from the bridge circuit digitally by a microcomputer according to the output from the temperature sensor during the pressure measuring, with the pre-searched temperature characteristics of the bridge circuit being stored in a memory. However, this temperature compensation requires a large-sized and complex circuit, and an interface apparatus to match with other circuits.

Sensitivity-Temperature Compensation

In the conventional constant-current sensitivity-temperature self-compensating method, adequate temperature compensation is difficult to achieve if the temperature range is wide. This is caused by the facts that only the first-order term or linear member of the sensitivity temperature coefficient is compensated in a conventional method and the curvature (non-linearity) of temperature characteristic cannot be ignored for wide temperature range and high-precision temperature compensation. Further, as the resistance $R_g$ of the diffusion strain gauge G varies due to pressure, it cannot be expressed by a simple equation if the second-order term of temperature coefficient is taken into consideration. This would result in a complex calculation and this would make it difficult to compensate the temperature coefficients precisely. In this conventional method, therefore, it was difficult to take a concurrent compensation of both the first-order and second-order terms of sensitivity-temperature characteristics.

SUMMARY OF THE INVENTION

It is therefore an object of this invention to provide a semiconductor strain detector capable of performing a zero-point temperature or a sensitivity-temperature compensation with high precision for a wide temperature range with a simple circuit.

According to a first aspect of this invention, there is provided a semiconductor strain detector comprising: a semiconductor substrate having a strain sensitive region; a bridge circuit including strain gauges each disposed at least in part at the strain sensitive region, each strain gauge having a resistance varying in proportion to the strain of the strain sensitive region; a zero-point temperature compensating circuit for outputting a signal having a predetermined temperature characteristic; an operating circuit for adding up the output of the bridge circuit and the output of the zero-point temperature compensating circuit; and the zero-point temperature compensating circuit including (i) a thermosensitive resistor having a resistance varying depending on the temperature, and (ii) a constant current means for supplying to the thermosensitive resistor a constant current of a predetermined direction and a predetermined largeness, whereby the zero-point temperature compensating circuit outputs an amount of voltage depending on temperature and cancels a zero-point temperature characteristic of the bridge circuit.

For example, the zero-point temperature compensating circuit may include an operational amplifier having a resistor with a predetermined temperature characteristic in a feedback passage, and also having a current setting resistor. One end of the current setting resistor is connected to the inverted input terminal and the other end thereof is connected to a power supply so that a predetermined differential potential can be supplied to both ends of the current setting resistor to generate constant current in the current setting resistor.

According to a second aspect of this invention, there is provided a semiconductor strain detector comprising: a semiconductor substrate having a strain sensitive region in which a strain may be produced; a bridge circuit including strain gauges each disposed at least in part at the strain sensitive region, each strain gauge having a resistance varying in proportion to the strain of the strain sensitive region; and a sensitivity-temperature compensating circuit for compensating a temperature change of the sensitivity of the bridge circuit, the sensitivity-temperature compensating circuit including (i) an operational amplifier for receiving the output of the bridge circuit and for amplifying it operationally, (ii) a first diffusion resistor formed by diffusing impurities in the semiconductor substrate at a predetermined concentration and disposed in a passage leading to an input terminal of the operational amplifier, and (iii) a second diffusion resistor formed by diffusing impurities in the semiconductor substrate at a concentration different from the concentration of the impurities of the first diffusion resistor and disposed in a return passage connecting the input terminal of the operational amplifier and an output terminal thereof, whereby a temperature change of the sensitivity of each strain gauge is canceled by the difference in temperature coefficient of resistance between the first and second diffusion resistors.

The temperature characteristics of these first and second diffusion resistors can be set, with considering up to the second-order term of the temperature characteristic of the bridge circuit. Therefore, this method realizes wide-range sensitivity-temperature compensation.

The semiconductor strain detector of this invention operates in the following manner:

As the individual semiconductor strain gauge is disposed in the strain sensitive region of the silicon substrate, a strain of the silicon substrate will be a strain of the semiconductor strain gauge. The resistance of the semiconductor strain gauge varies in proportion to the strain. Since the bridge circuit is composed of the semiconductor strain gauges, the output of the bridge circuit also varies depending on the strain.

Here the zero-point varies depending on the temperature, resulting from the scatter of temperature coefficient of the semiconductor strain gauge; this zero point must be compensated fluctuation depending on temperature so that errors in measurement with this semiconductor strain detector could be reduced. To this end, in the first aspect of this invention, the semiconductor strain detector has a zero-point temperature compensating circuit for rendering a constant current to flow to the thermosensitive resistor having a predetermined temperature characteristic. The output from this zero-point temperature compensating circuit is added to the output from the bridge circuit so that the temperature characteristic of the output of the bridge circuit is canceled by the zero-point temperature compensating circuit. Effective zero-point temperature compensation is achieved by this method.

Further, it is characteristic for the first aspect of this invention that the temperature characteristic of the zero-point temperature compensating circuit can be adjusted by varying the current value of the constant current means. This realizes effective zero-point temperature compensation depending on the temperature characteristic of the bridge circuit.

The output of the bridge contains the contribution of the temperature dependence of sensitivity to strain. This is why sensitivity-temperature compensation is necessary. According to the second aspect of this invention, the first and second diffusion resistors having their respective predetermined resistances are disposed in the input passage and the feedback passage of the operational amplifier which amplifies the output of the bridge circuit. This circuit can compensate the sensitivity-temperature characteristic up to the second-order term thereof. Consequently it is possible to perform a sensitive-temperature compensation over a wide range with high precision.

The above and other advantages, features and additional objects of this invention will be manifest to those versed in the art upon making reference to the following detailed description and the accompanying drawings in which several structural embodiments incorporating the principles of this invention are shown by way of illustrative example.

BRIEF DESCRIPTION OF THE DRAWINGS

FIG. 8 is a characteristic graph showing the output-temperature and sensitivity-temperature characteristics obtained from simulating the fourth embodiment;

DETAILED DESCRIPTION

Embodiments of this invention will now be described with reference to the accompanying drawings.

First Embodiment

Figure 1:
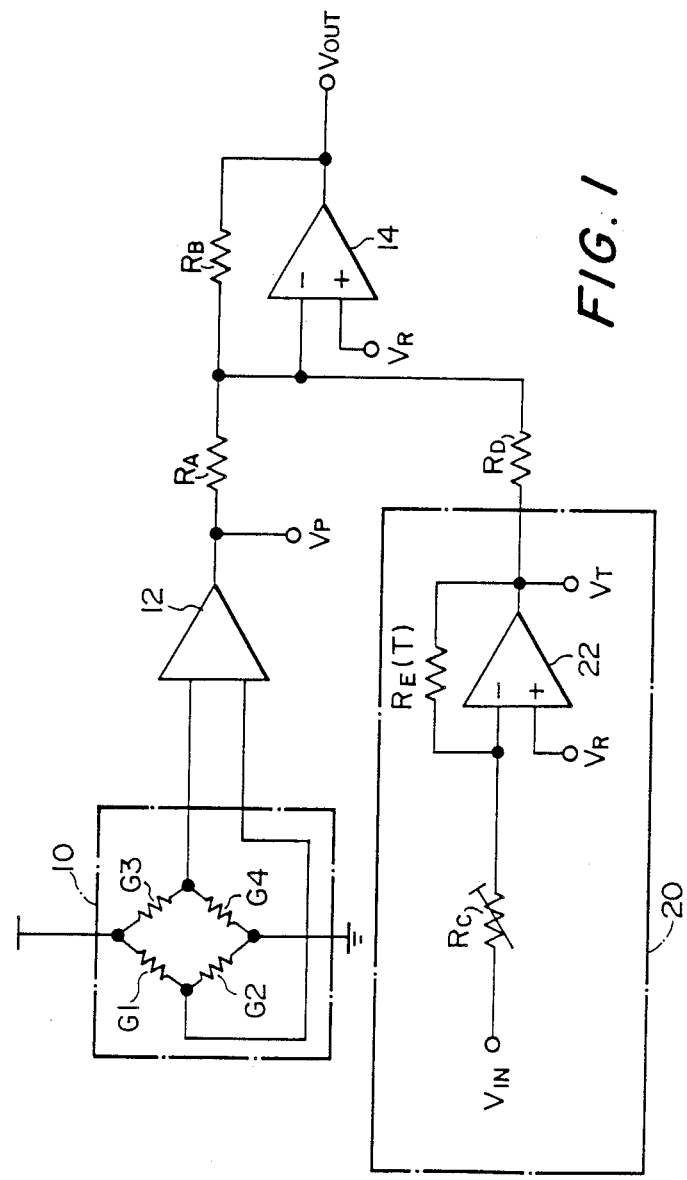
FIG. 1 is a circuit diagram showing a semiconductor strain detector according to a first embodiment of this invention.

FIG. 1 shows a first embodiment of the semiconductor strain detector having a zero-point temperature compensating circuit of the first aspect of this invention. In FIG. 1, a bridge circuit 10 is composed of four diffusion strain gauges $G_1$, $G_2$, $G_3$, $G_4$. The output of this bridge circuit 10 is connected to an input-side series resistor $R_A$ inserted between the input-side of an operational amplifier 14 and an operating circuit 12, and the other terminal of the series resistor $R_A$ is connected to an inverted input terminal of the operational amplifier 14. A feedback resistor $R_B$ is connected between the output terminal and the inverted input terminal of the operational amplifier 14.

The output corresponding to strains of the respective diffusion strain gauge $G_1$, $G_2$, $G_3$, $G_4$ in the bridge circuit 10 is converted to a predetermined voltage $V_P$ by the operating circuit 12 and then receives predetermined amplification from the operational amplifier 14, whereupon it is outputted as a voltage $V_{OUT}$.

A zero-point temperature compensating circuit 20 is composed of a current setting resistor $R_C$, an operational amplifier 22, and a negative feedback resistor $R_E$ associated with the operational amplifier 22. The output side of this zero-point temperature compensating circuit 20 is connected to the inverted input terminal of the operational amplifier 14 via resistor $R_D$, being added to the output signal of the bridge circuit 10. $V_R$ in FIG. 1 designated reference voltage; $V_{IN}$, input voltage; and $V_T$, output voltage of the zero-point temperature compensation circuit.

Using a resistor of a good linearity for the negative feedback resistor $R_E$ of the operational amplifier 22, the second-order term of temperature coefficient of the resistor can be ignored, and therefore, the temperature characteristic of this negative feedback resistor $R_E$ can be expressed by the following equation:

$$R_E(T) = R_E(0) \cdot (1 + \alpha T) \tag{2}$$

where $R_E(0)$ is a resistance value at a primary temperature (e.g., 0° C.) of the negative feedback resistor $R_E$, T is a temperature, $\alpha$ is a temperature coefficient of resistance of the negative feedback resistor $R_E$.

If a resistor having a very small temperature coefficient of resistance is used for the current setting resistor $R_C$, a current normally in response to a differential voltage between the input voltage $V_{IN}$ and the reference voltage $V_R$ flows to the current setting resistor $R_C$, irrespective of the temperature change. If the input voltage $V_{IN}$ and the reference voltage $V_R$ do not have a temperature dependence, this current flowing to the negative feedback resistor $R_E$ is normally constant regardless of temperature change. Namely, a current value at the negative feedback resistor $R_E$ can be set to a constant value depending on the values of input voltage $V_{IN}$, the reference voltage $V_R$ and current setting resistor $R_C$.

If the resistance value and the temperature characteristic of the negative feedback resistor $R_E$ are known, it is possible that the output-side voltage $V_T$ of operational amplifier 22 has desired temperature characteristic. That is, the output voltage $V_T$ of zero-point temperature compensating circuit 200 is expressed by the following equation:

$$V_T(T) = -R_E(T) \cdot (V_{IN} - V_R)/R_C + V_R \tag{3}$$

Generally, input voltage $V_{IN}$ is connected to a power source with voltage $V_{CC}$ or the ground, and the reference voltage $V_R$ is set to the voltage at a midpoint of the circuit. If $V_{IN} < V_R$, the temperature characteristic of the output voltage $V_T$ is positive; if $(V_{IN} > V_R)$, the temperature characteristic of the output voltage $V_T$ is negative.

Figure 2:
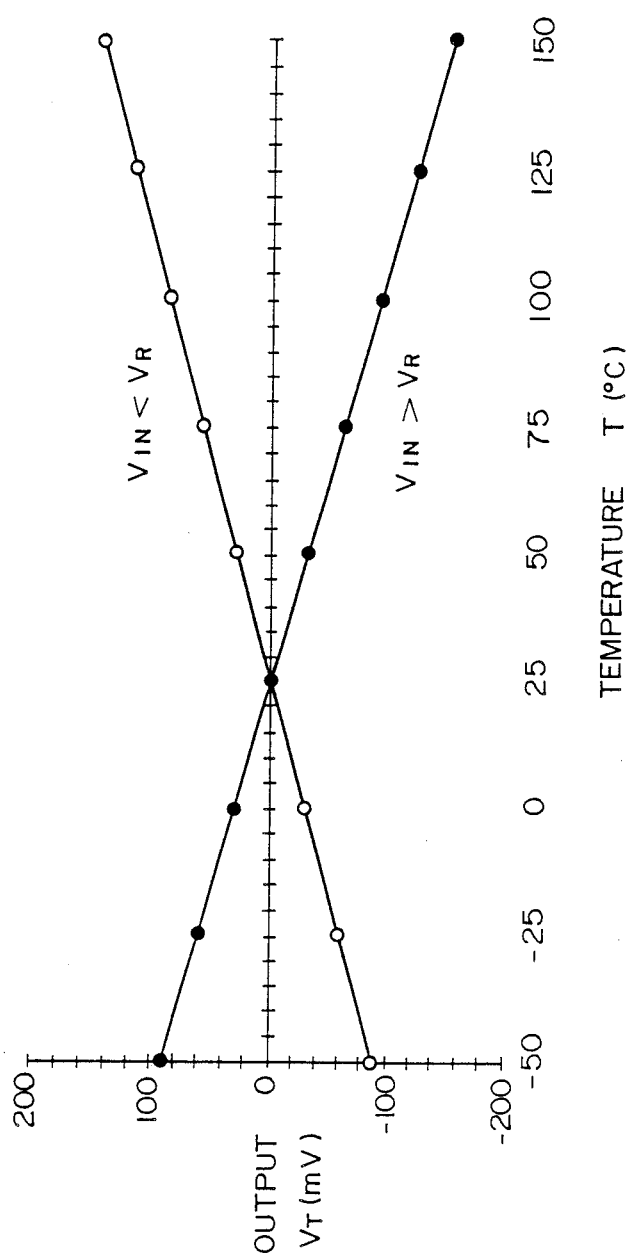
FIG. 2 is a graph showing temperature characteristic lines of the output of a zero-point temperature compensating circuit in the first embodiment.

The temperature characteristic of the output voltage $V_T$ is shown in FIG. 2. By adjusting the current setting resistor $R_C$, the input voltage $V_{IN}$ and the reference voltage $V_R$, it is possible to give a desired temperature characteristic to the output voltage $V_T$ of the zero-point temperature compensating circuit 20.

The output of the zero-point temperature compensating circuit 20 is inputted to the inverted input terminal of the operational amplifier 14 via the resistor $R_D$. Consequently, as the output voltage $V_P$ from the bridge circuit 10 and the output voltage $V_T$ from the zero-point temperature compensating circuit 20 are put together, the output voltage $V_{OUT}$ of the operational amplifier 14 can be expressed by the following equation:

$$V_{OUT} = G_P(V_P - V_R) + G_T(V_T - V_R) + V_R \tag{4}$$

where $G_P = -R_B/R_A$ and $G_T = -R_B/R_D$.

Therefore, by measuring the zero-point temperature characteristic of the output voltage $V_P$ of the bridge circuit 10 and rendering the output voltage $V_T$ to have such a temperature characteristic as to compensate this zero-point temperature characteristic, it is possible to perform zero-point temperature compensation at the output voltage $V_{OUT}$. At that time, the polarity of the temperature characteristic of the zero-point temperature compensating circuit 20 is determined by the voltage of the terminal to which the input of operational amplifier 14 is connected. The gradient of this characteristic can be adjusted by changing the resistance value of the current setting resistor $R_C$ so as to optimize the current flowing through the negative feedback resistor $R_E$ having a predetermined temperature dependence, or by changing the resistance value of the resistor $R_D$ so as to optimize the gain $G_T$ of the operational amplifier 14.

According to this embodiment, it is possible to perform a zero-point temperature compensation, whether the bridge circuit 10 is driven by constant current or constant voltage. Further, adjusting the temperature characteristic of the output voltage $V_T$ of the zero-point temperature compensating circuit 20 is very easy. This is caused by the fact that the temperature characteristic of $V_T$ corresponds to the output temperature characteristic of the bridge circuit 10.

Second Embodiment

Figure 3:
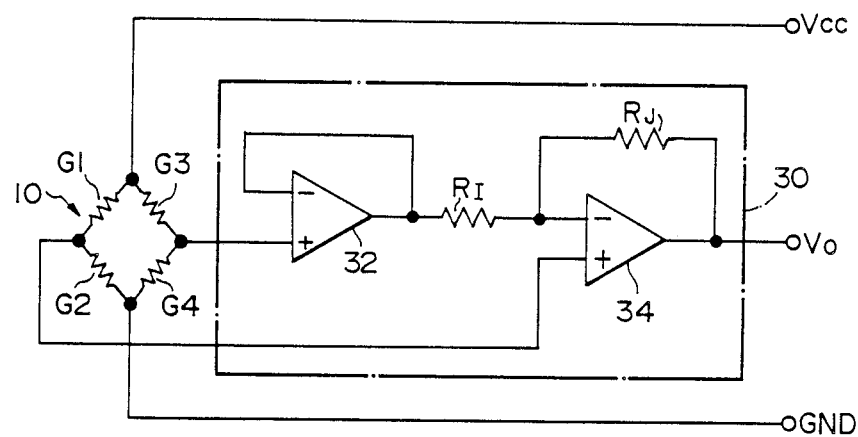
FIG. 3 is a circuit diagram showing a second embodiment.

FIG. 3 shows a sensitivity-temperature compensating circuit according to the second embodiment of this invention. In FIG. 3, the one output terminal of the bridge circuit 10 composed of the diffusion strain gauges $G_1$, $G_2$, $G_3$, $G_4$ is connected to the non-inverted input terminal of an operational amplifier 32. The inverted input terminal and the output terminal of this operational amplifier 32 are short-circuited to constitute a voltage follower. The output of the operational amplifier 32 is connected to the diffusion resistor $R_I$, the other terminal of which is connected to the inverted input terminal of operational amplifier 34. Between the inverted input terminal and the output terminal of the operational amplifier 34, the diffusion resistor $R_J$ having surface impurity concentration different from that of the diffusion resistor $R_I$ is connected as a negative feedback resistor.

The other output of the bridge circuit 10 is connected to the non-inverted input terminal of the operational amplifier 34.

The sensitivity-temperature characteristic $S(T)$ of the bridge circuit 1 composed of the diffusion strain gauges $G_1$, $G_2$, $G_3$, $G_4$ of FIG. 3 as well as the temperature characteristics $R_I(T)$, $R_J(T)$ of the diffusion resistors $R_I$, $R_J$ can be approximated by the following equations:

$$S(T) = S(0)(1 + \beta_1 T + \beta_2 T^2) \tag{5}$$

$$R_I(T) = R_I(0)(1 + \alpha_{I1} T + \alpha_{I2} T^2) \tag{6}$$

$$R_J(T) = R_J(0)(1 + \alpha_{J1} T + \alpha_{J2} T^2) \tag{7}$$

where $S(0)$ is the output of the bridge circuit 10 at a primary temperature, $R_I(0)$ and $R_J(0)$ are resistance values of the respective resistors $R_I$, $R_J$, $\beta_1$ and $\beta_2$ are the first-order-term and the second-order-term temperature coefficients of resistance, respectively, of the bridge circuit 10, $\alpha_{I1}$ and $\alpha_{I2}$ are the first-order-term and second-order-term temperature coefficients of resistance, respectively, of the diffusion resistor $R_I$, and $\alpha_{J1}$ and $\alpha_{J2}$ are the first-order-term and second-order-term temperature coefficients of resistance, respectively, of the diffusion resistor $R_J$.

Consequently, the output $V_0$ of sensitivity-temperature compensating circuit 30 can be expressed by the following equation:

$$V_0 = -\{R_J(T)/R_I(T)\} \cdot S(T) \tag{8}$$

Thus, the output $V_0$ of the sensitivity-temperature compensating circuit 30 is a product made by multiplying the output $S(T)$ of the bridge circuit 10 by the amplification constant $R_J(T)/R_I(T)$ of the operational amplifier 34.

Now as the above equations (6), (7) relating to the temperature characteristics of the resistors $R_I$, $R_J$ and the equation (5) relating to the temperature characteristic of the sensitivity S are substituted for the respective members in the equation (8), the output voltage $V_0$ can be expressed as follows:

$$V_0 = -\{R_J(0)/R_I(0)\} \cdot S(0) \cdot \{(1 + \alpha_{J1} T + \alpha_{J2} T^2)/(1 + \alpha_{I1} T + \alpha_{I2} T^2)\} \cdot (1 + \beta_1 T + \beta_2 T^2) \tag{9}$$

In this equation (9), as the third-order term and higher order terms, which are very less influential on the results of the temperature coefficients, are ignored, then it can be approximately expressed as follows:

$$V_0 = -\{R_J(0)/R_I(0)\} \cdot S(0) \cdot \{1 + (\alpha_{J1} - \alpha_{I1} + \beta_1)T + (\alpha_{J2} - \alpha_{I2} + \beta_2)T^2\} \tag{10}$$

Thus if the suitable combination of the resistors $R_I$, $R_J$ is selected, the temperature characteristic of the sensitivity in the output of the bridge circuit 10 can be compensated up to the second-order-term coefficient.

Therefore, according to this invention, it is possible to compensate the reduced sensitivity of the diffusion strain gauges $G_1$, $G_2$, $G_3$, $G_4$ due to temperature rise as well as the non-linear characteristic resulting from the second-order term of the sensitivity-temperature characteristic.

Figure 4:
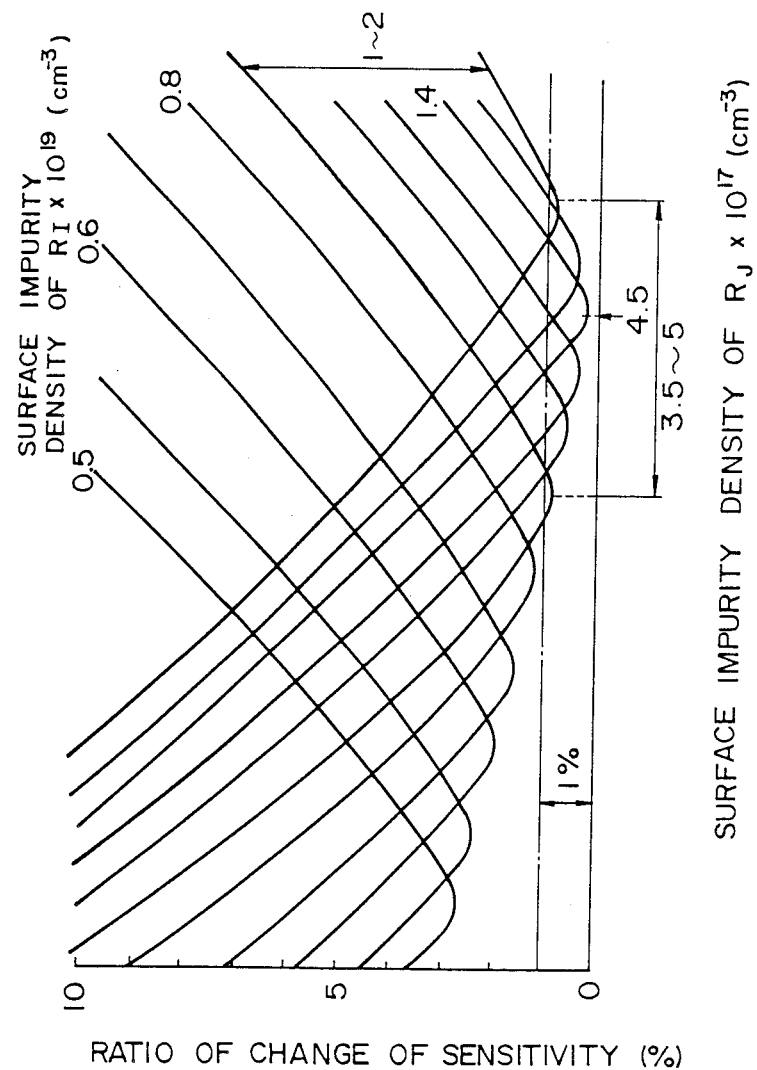
FIG. 4 is a characteristic graph showing the results obtained with the most suitable combination of diffusion strain gauges and resistors $R_I$, $R_J$ according to a computer simulation.

Here, the relation between the change of the output $V_0$ and the surface impurity concentration was calculated by simulating on a computer the relation between the surface impurity concentration of the diffusion resistors $R_I$, $R_J$ and the sensitivity of the output $V_0$ by use of the first-order-term and second-order-term temperature coefficients of the resistors $R_I$, $R_J$ in a temperature range of from $-50°$ C. to $150°$ C. The results of the simulation are shown in FIG. 4. The surface impurity concentrations of the resistor $R_I$ and those of the strain gauge G were regarded as the same for simplification of calculation.

It can be understood from FIG. 4 that when the surface impurity concentration of the resistor $R_I$ and that of the diffusion strain gauges $G_1$, $G_2$, $G_3$, $G_4$ is $1.4 \times 10^{19}$ atoms/cm$^3$, and the impurity concentration of the resistor $R_J$ is $4.5 \times 10^{17}$ atoms/cm$^3$, the temperature characteristic of the detector is optimized. The sensitivity change of the output $V_0$ in the temperature range of from $-50°$ C. to $150°$ C. is 0.2% under this condition. In the range where the surface impurity concentration of the resistor $R_I$ and of the diffusion strain gauges $G_1$, $G_2$, $G_3$, $G_4$ is $1 \times 10^{19}$ to $2 \times 10^{19}$ atoms/cm$^3$ and where the surface impurity concentration of the resistor $R_J$ is $3.5 \times 10^{17}$–$5 \times 10^{17}$ atoms/cm$^3$, the temperature change of the output $V_0$ is within $\pm 1\%$, which does not matter practically.

Generally, the sensitivity-temperature characteristic of a diffusion strain gauge is lowered along with temperature, and therefore, the second-order term cannot be ignored if the temperature range is wide. On the other hand, a diffusion resistor formed on a silicon single crystal has temperature characteristic increasing along with temperature, having positive and second-order-term temperature coefficient also. These facts are specifically linked with the surface impurity concentration and therefore can be controlled by the manufacturing processes. So, it is possible to compensate concurrently the first-order and second-order terms of the sensitivity by using different resistors for the series resistor $R_I$ and the negative feedback resistor $R_J$ of the inverted amplifying circuit constituted by an operational amplifier.

Further, because the sensitivity-temperature characteristic can be compensated by the temperature change of the ratio $R_I/R_J$, it is also possible to compensate both the positive and negative direction of the non-linear and linear portions by the combination of the resistors $R_I$, $R_J$. Furthermore, according to the detector of this invention, since the sensitivity-temperature compensating circuit is formed on a silicon single crystal substrate, it is possible to reduce the size of the entire detector to compact and also to integrate the entire detector on an IC chip.

Third Embodiment

Figure 5:
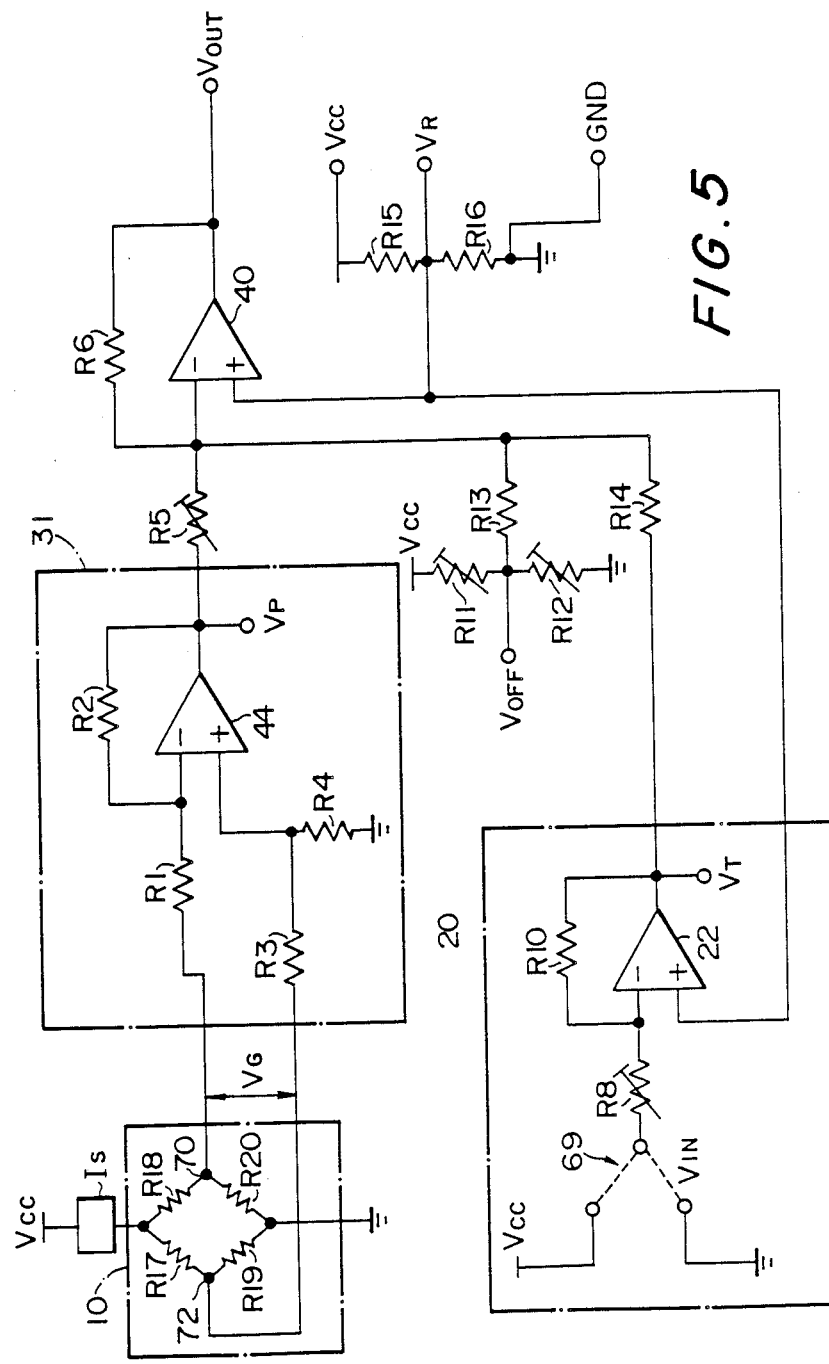
FIG. 5 is a circuit diagram showing a third embodiment.

FIG. 5 shows a semiconductor pressure sensor, which uses semiconductor strain gauges, according to a third embodiment of this invention.

In FIG. 5, a bridge circuit 10 is composed of four diffusion strain gauges $R_{17}$, $R_{18}$, $R_{19}$, $R_{20}$ formed on a silicon single crystal, substrate. This bridge circuit 10 is driven by a constant current circuit Is. In proportion to the applied pressure, the resistances of the diffusion strain gauges $R_{17}$, $R_{20}$, $R_{18}$, $R_{19}$ vary to produce from output terminals 70, 72 of the bridge circuit 10 an output voltage $V_G$ proportional to the pressure.

The output terminals 70, 72 are connected to amplifying circuit 31 composed of operational amplifier 44 and four resistors $R_1$, $R_2$, $R_3$, $R_4$. Specifically, one of the output terminals 70 is connected to the inverted input terminal of the operational amplifier 14 via the resistor $R_1$, and the other output terminal 72 is connected to the non-inverted input terminal of the operational amplifier 44 via the resistor $R_3$. Between the output terminal and the inverted input terminal of the operational amplifier 44, the negative feedback resistor $R_2$ is disposed. The non-inverted input terminal of the operational amplifier 44 is connected to the ground via the resistor $R_4$. Consequently, the output of the bridge circuit 10, namely, the sensitivity to given pressure is amplified to hundreds mV at the amplifying circuit 31 and is outputted as the output $V_P$.

A zero-point temperature compensating circuit 20 is composed of thermosensitive resistor $R_{10}$, current setting resistor $R_8$ and operational amplifier 22. One terminal of the current setting resistor $R_8$ is connected selectively to the power source supplying voltage $V_{CC}$ or the ground by switch 69; therefore, the input voltage $V_{IN}$ of the one terminal of the current setting resistor $R_8$ is set selectively to zero or the power source voltage $V_{CC}$.

The other terminal of the current setting resistor $R_8$ is connected to the inverted input terminal of the operational amplifier 22. The negative feedback resistor $R_{10}$ is connected between the inverted input terminal and the output terminal of the operational amplifier 22. Furthermore reference voltage $V_R$ is supplied to the non-inverted input terminal of the operational amplifier 22.

Consequently, like the first embodiment, the current setting resistor $R_8$ makes a desired current flow in the thermosensitive resistor $R_{10}$. By shifting the switch 69 selectively to the power source voltage $V_{CC}$ or the ground, it is possible to select the power source voltage $V_{CC}$ or zero for the input voltage $V_{IN}$.

The reference voltage $V_R$ to be inputted to the non-inverted input terminal of the operational amplifier 22 can be determined at a desired value with resistors $R_{15}$, $R_{16}$ disposed between the power source with voltage $V_{CC}$ and the ground. Further, because offset voltage $V_{OFF}$ adjustable by variable resistors $R_{11}$, $R_{12}$ is inputted to the inverted input terminal of operational amplifier 40 via resistor $R_{13}$, the offset voltage for the output of the operational amplifier 40 can be adjusted when a given pressure is zero.

The output $V_P$ of the bridge circuit 10 after amplified by the amplifying circuit 31, the output $V_T$ of the zero-point temperature compensating circuit 20, and the offset voltage $V_{OFF}$ are connected to the inverted input terminal of the operational amplifier 40 via the respective resistors $R_5$, $R_{13}$, $R_{14}$, to construct a summing circuit.

Further, the output $V_P$ of the operational amplifier 14 is inputted to the inverted input terminal of the operational amplifier 40 via the resistor $R_5$. Between the output terminal and the inverted input terminal of the operational amplifier 40, negative feedback resistor $R_6$ is connected. Therefore, the operational amplifier 40 amplifies the output $V_P$ of the bridge circuit 10 of the strain gauges in proportion to the ratio of the resistors $R_5$, $R_6$. This output is put together with the output $V_T$ of the zero-point temperature compensating circuit 20, and finally the volt-order output $V_{OUT}$ is outputted.

The output $V_{OUT}$ of the semiconductor pressure sensor of FIG. 5 can be expressed by the following equation:

$$V_{OUT} = G_P(V_P - V_R) + G_T(V_T - V_R) + G_0 \cdot (V_{OFF} - V_R) + V_R \quad (11)$$

where $G_P = -(R_6/R_5)$, $G_T = -(R_6/R_{14})$ and $G_0 = -(R_6/R_{13})$.

This equation reveals that the outputs $V_P$, $V_T$, $V_{OFF}$ are linked with the output $V_{OUT}$ individually and independently so as to be adjustable individually and independently. The third member of this equation is used for offset adjustment of the entire circuit, thus making it stable with respect to temperature change.

If the surface impurity concentration of diffusion strain gauges $R_{17}$, $R_{18}$, $R_{19}$, $R_{20}$ is set to about $10^{20}$ (atoms/cm$^3$), the sensitivity change (of the bridge circuit 10) along with the temperature can be compensated by itself due to the resistor-temperature characteristic of the diffusion strain gauges $R_{17}$, $R_{18}$, $R_{19}$, $R_{20}$ as the bridge circuit 10 is driven on constant current.

Namely, the output compensated in sensitivity and amplified by the amplifying circuit 31 is outputted as the voltage $V_P$ expressed by the following equation:

$$V_P = -(R_2/R_1) \cdot V_G \quad (12)$$

where $R_1 = R_3$, $R_2 = R_4$, $R_{17} = R_{18} = R_{19} = R_{20} << R_1$).

The zero-point temperature change of bridge circuit 10 appears in the output $V_P$ as amplified by the amplifying circuit 31. This characteristic with respect to temperature appears in the output $V_P$ as a substantially linear change. By giving to the output $V_T$ the characteristic inverted in polarity against this characteristic and adding up the outputs $V_P$, $V_T$ at the summing circuit, i.e., the operational amplifier 40, it is possible to perform zero-point temperature compensation.

For example, if phosphorus (P) is used as an n-type impurity and if the surface impurity concentration is at least $10^{19}$ (atoms/cm$^3$), the temperature characteristic of such high-concentration diffusion resistor is very linear. Therefore, this n-type high-concentration diffusion resistor is preferably used for the thermosensitive resistor $R_{10}$. The output $V_T$ of the zero-point temperature compensating circuit 20 can be expressed by the following equation:

$$V_T(T) = -R_{10}(T) \cdot I + V_R \quad (13)$$

where I stands for a current flowing through $R_{10}$.

Here if a bias current flowing to the inverted input terminal of the operational amplifier 40 is ignored, the current I is equal to the current flowing in the resistor $R_8$ because of the output $V_T$ of the zero-point temperature compensating circuit 20. If the resistor $R_8$ has very small temperature coefficient of resistance, a constant current flows in the thermosensitive resistor $R_{10}$ regardless of temperature change. Then by adjusting the resistance of the resistor $R_8$, it is possible to vary the output $V_T$ of the zero-point temperature compensating circuit 20 depending on temperature. The direction of the current I flowing through the thermosensitive resistor $R_{10}$ can be changed over, depending on whether the input voltage $V_{IN}$ is larger or smaller than the reference voltage $V_R$. As a result, both positive and negative zero-point temperature compensations can be performed.

At the inverted input terminal of the operational amplifier 22, a voltage substantially equal to the reference voltage $V_R$ appears by the basic function of an operational amplifier. Preferably, the reference voltage $V_R$ should be stable with respect to temperature change.

If the input voltage $V_{IN}$ at the switch 69 is larger than the reference voltage $V_R$, the voltage drop due to the thermosensitive resistor $R_{10}$ increases along with temperature rise as the thermosensitive resistor $R_{10}$ has a positive temperature characteristic. The current thus flows in the direction of the output of the operational amplifier 22 by the switch 69. Because the potential at the inverted input terminal of the operational amplifier 22 is substantially equal to the reference voltage $V_R$ and hence does not vary with temperature, the output voltage $V_T$ of the zero-point temperature compensating circuit 20 is lowered.

Reversely, if the input voltage $V_{IN}$ at the switch 69 is smaller than the reference voltage $V_R$, the current flows from the output side of the operational amplifier 22 toward the switch 69. The voltage drop due to the thermosensitive resistor $R_{10}$ is large as the voltage at the inverted input terminal of the operational amplifier 22 is constant. This is why the output $V_T$ of the zero-point temperature compensating circuit 20 increases. Now as marked only the change of zero point, the change $\Delta V_{OUT}$ of the output $V_{OUT}$ is expressed by the following equation:

$$\Delta V_{OUT}(T) = G_P V_P(T) + G_T V_T(T) \quad (14)$$

Namely, by measuring the zero-point temperature characteristic of the output $V_P$ and selecting the output $V_T(T)$ so as to satisfy $\Delta V_{OUT}(T) = 0$ from the relation between $G_P$ and $G_T$, a zero-point temperature compensation can be performed.

Further, as discussed above, the switch 69 is connected to the power source $V_{CC}$ or the ground. Then if the zero-point temperature characteristic of the output $V_P$ has a negative temperature characteristic, the switch 69 is connected to the ground to give a positive temperature characteristic to the output $V_T$ of the zero-point temperature compensating circuit 20. The current to flow in the thermosensitive resistor $R_{10}$ is determined by adjusting the resistance of the current setting resistor $R_8$ so as to eliminate any temperature change of the output $V_{OUT}$. Thus the zero-point temperature compensation of the output $V_{OUT}$ can be achieved by the zero-point temperature compensating circuit 20.

Fourth Embodiment

Figure 6:
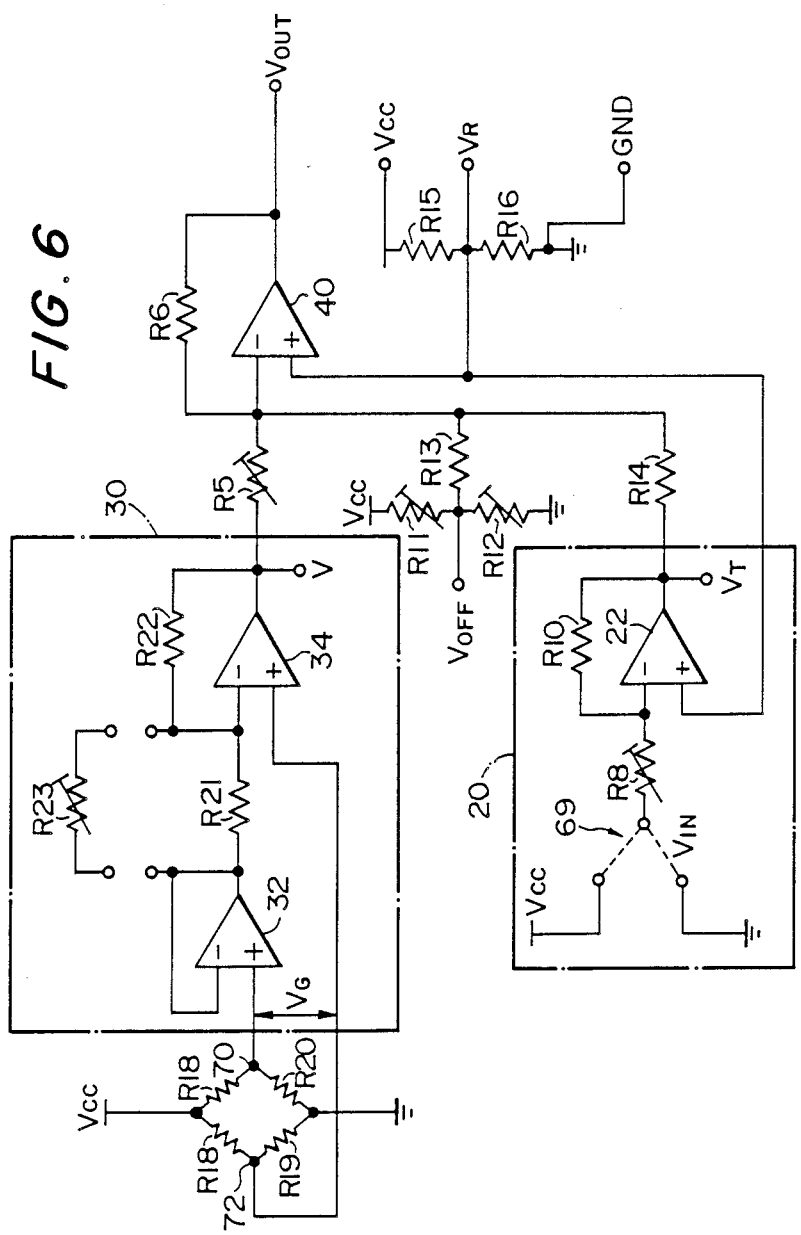
FIG. 6 is a circuit diagram showing a fourth embodiment.

FIGS. 6 and 7 show a fourth embodiment in which the principles of this invention are applied to an integrated pressure sensor. The bridge circuit 10 of FIG. 6 is driven by a constant voltage. One output terminal 70 of the bridge circuit 10 is connected to the non-inverted input terminal of an operational amplifier 32, to which an output terminal and a non-inverted input terminal are connected to constitute a so-called voltage follower.

A series resistor $R_{21}$ and a negative feedback resistor 22 of the operational amplifier 34 are composed of diffusion resistors having different surface impurity densities so that, like the second embodiment, sensitivity temperature compensation of the bridge circuit 10 is performed by the difference in temperature coefficient of their resistances.

The other output terminal 72 of the bridge circuit 10 is connected to non-inverted input of the operational amplifier 34. Thermosensitive resistor $R_{10}$ of zero-point temperature compensation circuit 20 is an n-type high-concentration diffusion resistor. Each of other resistors is a silicon-chromium thin film resistor having very small temperature coefficient of resistance.

The operational amplifiers are manufactured by a bipolar process. The diffusion strain gauges, temperature compensating diffusion resistors, thin film resistors and operational amplifiers are integrated on one silicon single crystal substrate. The characteristics of the integrated pressure sensor are adjusted generally by laser-trimming a thin film resistor on the substrate.

Here, this circuit is trimmed at four positions, i.e., the resistors, $R_{23}$, $R_8$, $R_5$, and $R_{11}$ or $R_{12}$. The resistor $R_{23}$ is a preliminary resistor to be used only when the parameters are greatly different from the sensitivity compensating conditions due to a staggered process. The resistor $R_5$ serves to adjust the span of the output $V_{OUT}$ of operational amplifier 40. For offset adjustment, the resistor $R_{11}$ or $R_{12}$ should be trimmed with laser. The current setting resistor $R_8$ adjusts the amount of current flowing in the thermosensitive resistor $R_{10}$ of the zero-point temperature compensating circuit 20 to thereby adjust the characteristic of zero-point temperature compensation.

Like the first and third embodiments, for adjusting the current setting resistor $R_8$, the zero-point temperature characteristic of the output voltage $V_P$ of sensitivity-temperature compensating circuit 30 is measured, the result of which indicates the polarity of the characteristic and shows whether the switch 69 should be connected to the power source or the ground. And the current setting resistor $R_8$ is trimmed to adjust its resistance so as to eliminate any temperature change of the output $V_{OUT}$, thereby determining the current flowing through the thermosensitive resistor 10 to perform a zero-point temperature compensation.

In this embodiment, like the third embodiment, since the outputs $V_P$, $V_T$, $V_{OFF}$ can be amplified individually and independently by the summing circuit composed of the operational amplifier 40 and the resistors $R_5$, $R_6$, $R_{13}$, $R_{14}$, independent adjustment of each output voltage $V_P$, $V_T$, $V_{OFF}$ can be achieved.

An integrated pressure sensor was manufactured on an experimental basis, in which the surface impurity concentration of the diffusion strain gauges and the resistor is $1.4 \times 10^{19}$ atoms/cm$^3$, and the surface impurity concentration of the resistor $R_{22}$ is $4.5 \times 10^{17}$ atoms/cm$^3$. FIG. 8 shows the output and the sensitivity-temperature characteristics of this experimental sensor. As shown in FIG. 8, the output-temperature characteristic is less than $\pm 1\%$ in a range of $-40°$ C. to $150°$ C.

Figure 7A:
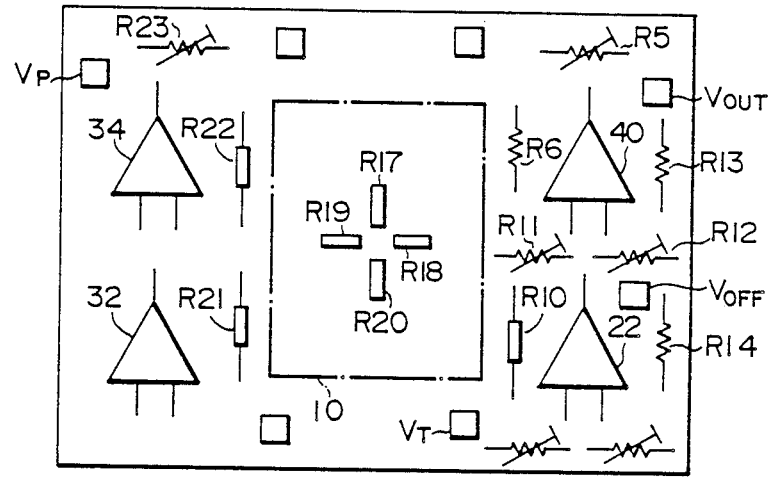
FIGS. 7(A) and 7(B) are schematic plan and cross-sectional views, respectively, of the fourth embodiment.
Figure 7B:
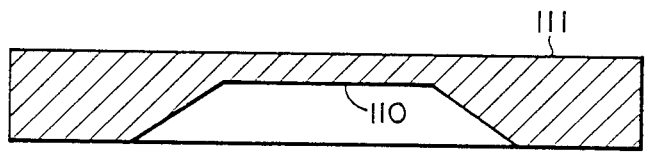

FIG. 6 is a circuit diagram showing a semiconductor strain detector according to the fourth embodiment. FIGS. 7(A) and 7(B) are plan and schematic cross-sectional views, respectively, of the semiconductor strain detector.

As shown in FIG. 7A, a bridge circuit 10 composed of diffusion strain gauges $R_{17}$, $R_{18}$, $R_{19}$, $R_{20}$ is formed on the main surface 111 of a diaphragm 110.

For achieving a micro-size detector, if circuit components constituting temperature-compensation circuit are formed on right and left ample marginal portions of the main surface 111 of the diaphragm 110, the resistors $R_{10}$, $R_{21}$, $R_{22}$ to detect temperature must be disposed at positions which are near the diaphragm 110 and which have an atmosphere temperature as equal to that of the diaphragm 110 as possible. However, if the resistors $R_{10}$, $R_{21}$, $R_{22}$ were brought too closely to the diaphragm 110, these resistors would have been subjected to mechanical influence due to the strain; therefore, about the edge portions must be avoided when mounting the resistors. The constant current circuit of the detector has a possibility of slightly generating heat by itself. Accordingly, in order to avoid this thermal influence, the resistors $R_{10}$, $R_{21}$, $R_{22}$ should not be disposed near the constant current circuit. The location of the resistors which is shown in FIG. 7A would satisfy these requirements.

Figure 9:
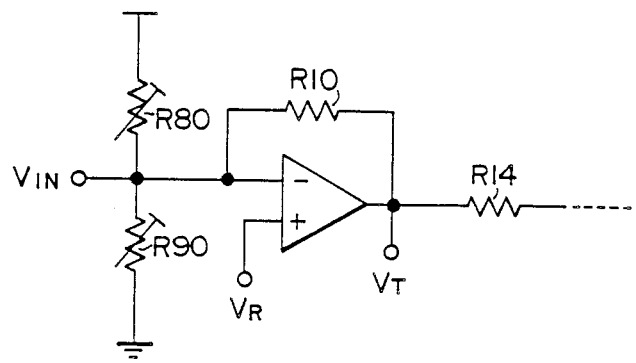
FIG. 9 is a circuit diagram showing a modification of the zero-point temperature circuit.
Figure 10:
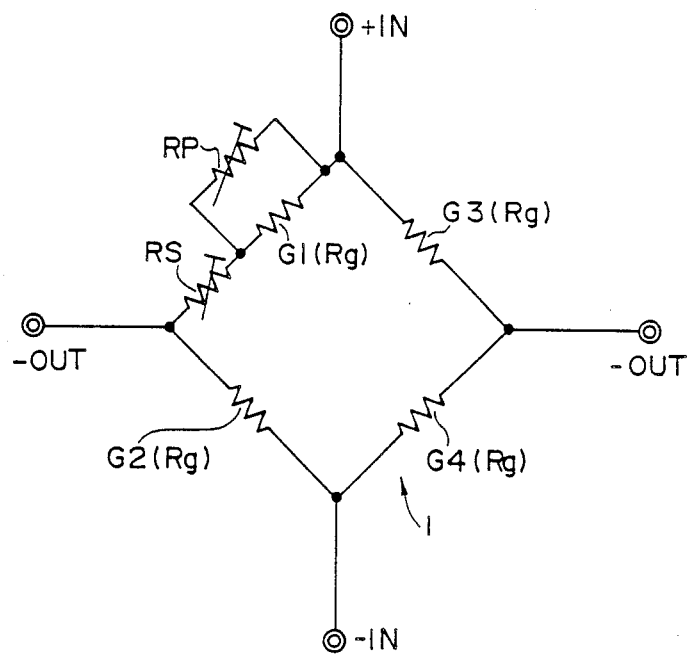
FIG. 10 is a circuit diagram showing an example of prior art zero-point temperature compensation.
Figure 11:
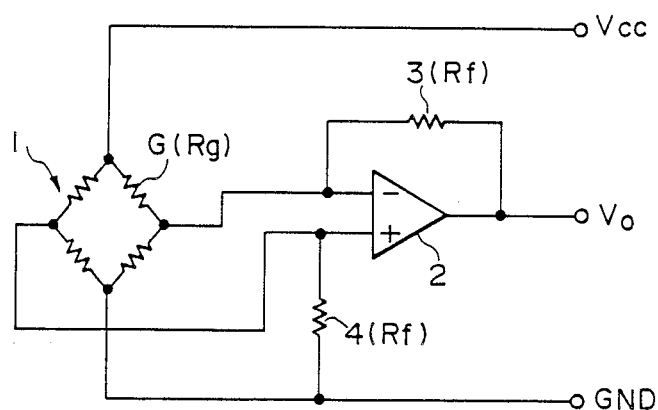
FIG. 11 is a circuit diagram showing an example of prior art sensitivity-temperature compensation.

FIG. 9 shows an modification of the zero-point compensating circuit 20. In this modified circuit 20, the input voltage $V_{IN}$ is determined by two series resistors $R_{80}$, $R_{90}$ whose resistances are adjustable with trimming. Namely, a switch is omitted to minimize the number of terminals, and the inverted input terminal of the operational amplifier 22 is connected to the power source with voltage $V_{CC}$ and the ground via the resistors $R_{80}$, $R_{90}$, respectively.

The zero-point temperature characteristic of the output $V_P$ of the sensitivity-temperature compensating circuit 30 is measured, and the resistors $R_{80}$, $R_{90}$ are eliminated depending on the polarity of this measured characteristic, by laser-trimming. The remaining resistor is applied to current setting. Consequently, the amount of current flowing in the thermosensitive resistor $R_{10}$ is controlled so that the output $V_T$ may have desired temperature characteristic to the output $V_T$.

In the foregoing illustrated embodiments, this invention is applied chiefly to detection of pressure; however, this invention should by no means be limited to these specific examples. For example, it can also be useful when embodied in apparatuses for detecting strains, loads, displacements, and torques.

What is claimed is:

1. A semiconductor strain detector comprising:
   (a) a semiconductor substrate having a strain sensitive region;
   (b) a bridge circuit including strain gauges each disposed at least in part at said strain sensitive region, each said strain gauge having a resistance varying in response to the strain of said strain sensitive region;
   (c) a zero-point temperature compensating circuit for outputting a signal having a predetermined temperature characteristic; and
   (d) an operational amplifier circuit for summing the output of said bridge circuit and the output of said zero-point temperature compensating circuit;
   (e) said zero-point temperature compensating circuit including (i) a thermosensitive resistor having a resistance varying depending on the temperature, and (ii) constant current means for supplying to said thermosensitive resistor a constant current of a predetermined direction and a predetermined amount, whereby a zero-point temperature characteristic of said bridge circuit is cancelled by the temperature characteristic of the output of said zero-point temperature compensating circuit.

2. A semiconductor strain detector according to claim 1, wherein said zero-point temperature compensating circuit includes a second operational amplifier having (i) a first input terminal to which a power source for supplying a predetermined input voltage $V_{IN}$ is connected via a current setting resistor whose resistance is constant regardless of the temperature change, (ii) a second input terminal to which a reference power source for supplying a reference voltage $V_R$ different from said input voltage $V_{IN}$ is connected, and (iii) said thermosensitive resistor being connected between said output terminal and said first input terminal of said second operational amplifier, thereby causing the constant current to flow in said thermosensitive resistor.

3. A semiconductor strain detector according to claim 2, wherein the resistance of said current setting resistor is sufficiently variable to adjust the temperature characteristic of the output of said zero-point temperature compensating circuit, said input voltage $V_{IN}$ being applied to an inverted input terminal constituting said first input terminal, said reference voltage $V_R$ being applied to a non-inverted input terminal constituting said second input terminal, said input voltage $V_{IN}$ being larger or smaller than said reference voltage $V_R$, thereby giving a negative or positive temperature characteristic to the output of said zero-point temperature compensating circuit, said zero-point compensating circuit further including a switch for selectively connecting said input terminal ($V_{IN}$) of said current setting resistor to a power supply with a power source voltage $V_{CC}$ or to the ground to give a positive or a negative temperature characteristic to the output of said zero-point temperature compensating circuit, said reference voltage $V_R$ to be supplied to said operational amplifier being obtained by dividing said power source voltage $V_{CC}$ with resistors.

4. A semiconductor strain detector according to claim 2, further including an adjustable resistor connected to the output passage of a sensitivity-temperature circuit in series, the other terminal thereof being connected to the inverted input terminal of a third operational amplifier whose output terminal is connected to said inverted input terminal, whereby the output of said sensitivity-temperature circuit can be adjusted in span by varying the resistance of said adjustable resistor, said current setting resistor being connected to a power source with a predetermined high voltage $V_{CC}$, the ground and the inverted terminal of said operational amplifier, being switchably connected so that said current setting resistor can be connected to either said power source or the ground, thereby giving a positive or a negative temperature characteristic to the output of said zero-point temperature compensating circuit, there being an offset voltage applied to the output of said zero-point temperature compensating circuit.

5. A semiconductor strain detector according to claim 2, wherein said zero-point compensating circuit further includes a switch for selectively connecting said input terminal ($V_{IN}$) of said current setting resistor to a power supply with a predetermined high voltage $V_{CC}$ or to the ground to give a positive or a negative temperature characteristic to the output of said zero-point temperature compensating circuit.

6. A semiconductor strain detector according to claim 2, wherein said current setting resistor is connected to a power source with a predetermined high voltage $V_{CC}$, the ground and the inverted terminal of said operational amplifier, being switchably connected so that said current setting resistor can be connected to either said power source or the ground, thereby giving a positive or a negative temperature characteristic to the output of said zero-point temperature compensating circuit.

7. A semiconductor strain detector comprising:
   (a) a semiconductor substrate having a strain sensitive region where a strain may be produced;
   (b) a bridge circuit including strain gauges each disposed at least in part at said strain sensitive region, each said strain gauge having a resistance varying in response to the strain of said strain sensitive region; and
   (c) a sensitivity-temperature compensating circuit for compensating a temperature change of the sensitivity of said bridge circuit, said sensitivity-temperature compensating circuit including (i) an operational amplifier for receiving the output of said bridge circuit and for amplifying said output, (ii) a first diffusion resistor formed by diffusing impurities in said semiconductor substrate at a predetermined concentration and disposed in a passage leading to an input terminal of said operational amplifier, and (iii) a second diffusion resistor formed by diffusing impurities in said semiconductor substrate at a concentration different from the concentration of the impurities of said first diffusion resistor and disposed in a return passage connecting said input terminal of said operational amplifier and an output terminal thereof, whereby the temperature change of the sensitivity of said each strain gauge is cancelled by the difference in temperature coefficient of resistance between said first and second diffusion resistors.

8. A semiconductor strain detector according to claim 7, wherein said sensitivity-temperature compensating circuit includes a second operational amplifier having (1) a first input terminal to which the output from said bridge circuit is to be inputted, (2) a second input terminal and an output terminal which are short-circuited mutually, and (3) said output terminal being connected to said first diffusion resistor, said sensitivity-temperature compensating circuit further including a resistor having an adjustable resistance which is disposed so as to be connected to said first diffusion resistor in parallel, said detector further including an adjustable resistor connected to the output passage of said sensitivity-temperature circuit in series, the other terminal thereof being connected to the inverted input terminal of a third operational amplifier whose output terminal is connected to said inverted input terminal, whereby the output of said sensitivity-temperature circuit can be adjusted in span by varying the resistance of said adjustable resistor, there being an offset voltage applied to the output of said zero-point temperature compensating circuit.

9. A semiconductor strain detector according to claim 7, wherein said sensitivity-temperature compensating circuit includes a second operational amplifier having (1) a first input terminal to which the output from said bridge circuit is to be inputted, (2) a second input terminal and an output terminal which are short-circuited mutually, and (3) said output terminal being connected to said first diffusion resistor.

10. A semiconductor strain detector according to claim 7, wherein said sensitivity-temperature compensating circuit further includes a resistor having an adjustable resistance which is disposed so as to be connected to said first diffusion resistor in parallel.

11. A semiconductor strain detector comprising:
   (a) a semiconductor substrate having a strain sensitive region;
   (b) a bridge circuit including strain gauges each disposed at least in part at said strain sensitive region, said each strain gauge having a resistance varying in response to the strain of said strain sensitive region;

(c) a zero-point temperature compensating circuit for outputting a signal having a predetermined temperature characteristic;

(d) an operational amplifier circuit for summing the output of said bridge circuit and the output of said zero-point temperature compensating circuit; and (e) a sensitivity-temperature compensating circuit for compensating a temperature change of the sensitivity of said bridge circuit;

(f) said zero-point temperature compensating circuit including (i) a thermosensitive resistor having a resistance varying depending on temperature, and (ii) a constant current means for supplying to said thermosensitive resistor a constant current with a predetermined direction and a predetermined amount via a current setting resistor, whereby a zero-point temperature characteristic of said bridge circuit is canceled by the temperature characteristic of the output of said zero-point temperature compensating circuit;

(g) said sensitivity-temperature compensating circuit including (1) a second operational amplifier for receiving the output of said bridge circuit and for amplifying said output, (2) a first diffusion resistor formed by diffusing impurities in said semiconductor substrate at a predetermined concentration and disposed in a passage leading to an input terminal of said operational amplifier, and (3) a second diffusion resistor formed by diffusing impurities in said semiconductor substrate at a concentration different from the concentration of the impurities of said first diffusion resistor and disposed in a return passage connecting said input terminal of said second operational amplifier and an output terminal thereof, whereby the temperature change of the sensitivity of said each strain gauge is canceled by the difference in temperature change coefficient of resistance between said first and second diffusion resistors.

12. A semiconductor strain detector according to claim 11, wherein said zero-point temperature compensating circuit includes a third operational amplifier having (i) a first input terminal to which a power source for supplying a predetermined input voltage $V_{IN}$ is connected via a current setting resistor in which a resistance varies, by a small amount, depending on the temperature change, (ii) a second input terminal to which a reference power source for supplying a reference voltage $V_R$ having a value different from said input voltage $V_{IN}$ is connected, and (iii) said thermosensitive resistor being connected between said output terminal and said first input terminal of said third operational amplifier, thereby causing the constant current to flow in said thermosensitive resistor, the resistance of said current setting resistor being adjustably variable to adjust the temperature characteristic of the output of said zero-point temperature compensating circuit.

13. A semiconductor strain detector according to claim 12, wherein both said zero-point compensating circuit and said sensitivity-temperature compensating circuit are formed on a peripheral surface of said strain sensitive region of said single semiconductor substrate.

14. A semiconductor strain detector according to claim 12, wherein said sensitivity-temperature compensating circuit includes a fourth operational amplifier having (1) a first input terminal to which the output from said bridge circuit is to be inputted, (2) a second input terminal and an output terminal which are short-circuited mutually, and (3) said output terminal being connected to said first diffusion resistor.

15. A semiconductor strain detector according to claim 12, wherein said sensitivity-temperature compensating circuit further includes a resistor having an adjustable resistance which is disposed so as to be connected to said first diffusion resistor in parallel.

16. A semiconductor strain detector according to claim 12, wherein said input voltage $V_{IN}$ is applied to an inverted input terminal constituting said first input terminal, said reference voltage $V_R$ being applied to a non-inverted input terminal constituting said second input terminal, said input voltage $V_{IN}$ being larger or smaller than said reference voltage $V_R$, thereby giving a negative or positive temperature characteristic to the output of said zero-point temperature compensating circuit.

17. A semiconductor strain detector according to claim 16, wherein said zero-point compensating circuit further includes a switch for selectively connecting said input terminal ($V_{IN}$) of said current setting resistor to a power supply with a predetermined high voltage $V_{CC}$ or to the ground to give a positive or a negative temperature characteristic to the output of said zero-point temperature compensating circuit.

18. A semiconductor strain detector according to claim 17, wherein said reference voltage $V_R$ to be supplied to said operational amplifier is obtained by dividing a power source voltage $V_{CC}$ with resistors.

19. A semiconductor strain detector according to claim 18, wherein said sensitivity-temperature compensating circuit includes a fourth operational amplifier having (1) a first input terminal to which the output from said bridge circuit is to be inputted, (2) a second input terminal and an output terminal which are short-circuited mutually, and (3) said output terminal being connected to said first diffusion resistor.

20. A semiconductor strain detector according to claim 19, wherein said sensitivity-temperature compensating circuit further includes a resistor having an adjustable resistance which is disposed so as to be connected to said first diffusion resistor in parallel, said detector further including an adjustable resistor connected to the output passage of said sensitivity-temperature circuit in series, a second terminal thereof being connected to the inverted input terminal of a third operational amplifier whose output terminal is connected to said inverted input terminal, whereby the output of said sensitivity-temperature circuit can be adjustable in span by varying the resistance of said adjustable resistor, there being an offset voltage applied to the output of said zero-point temperature compensating circuit.

21. A semiconductor strain detector according to claim 16, wherein said reference voltage $V_R$ to be supplied to said operational amplifier is obtained by dividing said power source voltage $V_{CC}$ with resistors, said current setting resistor being connected to a power source with said power source voltage $V_{CC}$, the ground and the inverted terminal of said operational amplifier, being switchably connected so that said current setting resistor can be connected to either said power source or the ground, thereby giving a positive or a negative temperature characteristic to the output of said zero-point temperature compensating circuit, said sensitivity-temperature compensating circuit including a fourth operational amplifier having (1) a first input terminal to which the output from said bridge circuit is to be inputted, (2) a second input terminal and an output terminal which are short-circuited mutually, (3) said output terminal being connected to said first diffusion resistor, and (4) a resistor having an adjustable resistance which is disposed so as to be connected to said first diffusion resistor in parallel, said detector further including an adjustable resistor connected to the output passage of said sensitivity-temperature circuit in series, a second terminal thereof being connected to both said inverted input terminal and a power source, whereby the output of said sensitivity-temperature circuit can be adjusted in span by varying the resistance of said adjustable resistor, there being an offset voltage applied to the output of said zero-point temperature compensating circuit.

22. A semiconductor strain detector according to claim 21, wherein both said zero-point compensating circuit and said sensitivity-temperature compensating circuit are formed on a peripheral surface of said strain sensitive region of said single semiconductor substrate.

* * * * *